United States Patent
Lee et al.

(10) Patent No.: US 9,835,892 B2
(45) Date of Patent: Dec. 5, 2017

(54) PROTECTIVE SHEET FOR LIQUID CRYSTAL DISPLAY SCREENS AND LIQUID CRYSTAL DISPLAY INCLUDING THE SAME

(71) Applicants: Bae Wook Lee, Uiwang-si (KR); Seok Jin Park, Uiwang-si (KR); Jong Hyuk Eun, Uiwang-si (KR); Sung Eun Lee, Uiwang-si (KR); Young Pil Jung, Uiwang-si (KR); O Yong Jeong, Uiwang-si (KR)

(72) Inventors: Bae Wook Lee, Uiwang-si (KR); Seok Jin Park, Uiwang-si (KR); Jong Hyuk Eun, Uiwang-si (KR); Sung Eun Lee, Uiwang-si (KR); Young Pil Jung, Uiwang-si (KR); O Yong Jeong, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 342 days.

(21) Appl. No.: 14/167,599

(22) Filed: Jan. 29, 2014

(65) Prior Publication Data

US 2014/0212648 A1    Jul. 31, 2014

(30) Foreign Application Priority Data

Jan. 29, 2013    (KR) .................. 10-2013-0010083

(51) Int. Cl.
| | |
|---|---|
| *B32B 7/02* | (2006.01) |
| *G02F 1/1333* | (2006.01) |
| *B32B 27/32* | (2006.01) |
| *B32B 27/08* | (2006.01) |
| *B32B 27/36* | (2006.01) |

(52) U.S. Cl.
CPC ............ *G02F 1/13338* (2013.01); *B32B 7/02* (2013.01); *B32B 27/08* (2013.01); *B32B 27/325* (2013.01); *B32B 27/365* (2013.01); *G02F 1/133308* (2013.01); *B32B 2250/24* (2013.01); *B32B 2307/21* (2013.01); *B32B 2307/558* (2013.01); *B32B 2307/734* (2013.01); *B32B 2309/105* (2013.01); *B32B 2457/202* (2013.01); *B32B 2571/00* (2013.01); *G02F 2001/133331* (2013.01); *Y10T 428/24975* (2015.01); *Y10T 428/265* (2015.01); *Y10T 428/31507* (2015.04)

(58) Field of Classification Search
CPC ............ B32B 2250/24; B32B 2307/21; B32B 2307/558; B32B 2307/734; B32B 2309/105; B32B 2457/202; B32B 2571/00; B32B 27/08; B32B 27/325; B32B 27/365; B32B 7/02; Y10T 428/24975; Y10T 428/265; Y10T 428/31507
USPC ........................................................ 428/212
See application file for complete search history.

(56) References Cited

U.S. PATENT DOCUMENTS

| 4,734,331 A * | 3/1988 | Giles, Jr. ................. B32B 27/08 |
| | | 428/412 |
| 2009/0080079 A1* | 3/2009 | Kogure ................... C08L 69/00 |
| | | 359/599 |

FOREIGN PATENT DOCUMENTS

| CN | 1470577 A | 1/2004 |
| CN | 1933930 A | 3/2007 |
| CN | 101395191 A | 3/2009 |
| CN | 101802122 A | 8/2010 |
| CN | 102007003 A | 4/2011 |
| JP | 2010-188651 A | 9/2010 |

OTHER PUBLICATIONS http://www.dictionary.com/browse/contacting, 2017.*
Chinese Office Action dated Feb. 1, 2016.

* cited by examiner

*Primary Examiner* — Aaron Austin
*Assistant Examiner* — Lawrence Ferguson
(74) *Attorney, Agent, or Firm* — Lee & Morse, P.C.

(57) ABSTRACT

A protective sheet includes a base layer, an interfacial layer, and a skin layer stacked in order. The base layer includes an aromatic polycarbonate resin, the interfacial layer includes an aliphatic polycarbonate resin; and the skin layer includes a cycloolefin polymer (COP) resin.

9 Claims, 1 Drawing Sheet

PROTECTIVE SHEET FOR LIQUID CRYSTAL DISPLAY SCREENS AND LIQUID CRYSTAL DISPLAY INCLUDING THE SAME

CROSS-REFERENCE TO RELATED APPLICATION

Korean Patent Application No. 10-2013-0010083, filed on Jan. 29, 2013, in the Korean Intellectual Property Office, and entitled: "Protective Sheet For Liquid Crystal Display Screens and Liquid Crystal Display Including The Same," is incorporated by reference herein in its entirety.

BACKGROUND

1. Field

Embodiments relate to a protective sheet for liquid crystal display screens and a display apparatus including the same.

2. Description of the Related Art

A liquid crystal display screen placed on an outermost portion of a liquid crystal display is generally formed of glass and is vulnerable to external impact. In particular, a liquid crystal display screen used in mobile phones is frequently exposed to external impact. Thus, a protective sheet is stacked on the liquid crystal display screen to protect the liquid crystal display screen.

SUMMARY

Embodiments are directed to a protective sheet for liquid crystal display screens including a base layer, an interfacial layer, and a skin layer, stacked in order. The base layer includes an aromatic polycarbonate resin, the interfacial layer includes an aliphatic polycarbonate resin, and the skin layer includes a cycloolefin polymer (COP) resin.

The aliphatic polycarbonate resin may be a polypropylene carbonate (PPC) resin.

The cycloolefin polymer resin may include at least one repeat unit derived from the group of monocycloolefin monomers, cyclic conjugated diene monomers, and norbornene monomers.

The cycloolefin polymer resin may include at least one repeat unit derived from the group of cyclobutene, cyclopentene, cyclohexene, cycloheptene, cyclooctene, 1,3-cyclopentadiene, 1,3-cyclohexadiene, 1,3-cycloheptadiene, 1,3-cyclooctadiene, norbornene, tetracyclododecene, and dicyclopentadiene.

The base layer may have a thickness from about 850 μm to about 1,000 μm. The interfacial layer may have a thickness from about 30 μm to about 50 μm. The skin layer may have a thickness from about 50 μm to about 80 μm.

The protective sheet may have a thickness ratio of the base layer to the skin layer from about 92:8 to about 95:5.

The protective sheet may have a water absorption of about 0.05% or less.

The protective sheet may have a warpage of about 0.3 mm or less relative to a floor or substrate on which the protective sheet is placed, as measured after a sample of the protective sheet having a width, length and thickness of about 50 mm, about 100 mm and about 1,000 μm is left at about 85° C. and about 85% RH for about 120 hours.

The protective sheet may further include at least one functional layer selected from an anti-reflective layer, an anti-static layer, and an anti-fingerprint layer, the at least one functional layer being stacked on an upper side of the skin layer.

Embodiments are also directed to a liquid crystal display including the protective sheet for liquid crystal display screens as described above.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
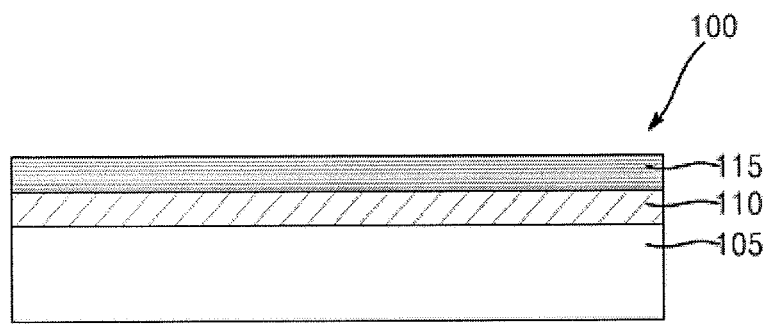
FIG. 1 illustrates a sectional view of a protective sheet for liquid crystal display screens according to an embodiment

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It is also to be understood that when a layer or element is referred to as being "on" another layer or substrate, it can be directly on the other layer or substrate, or intervening layers may also be present. Further, it is to be understood that when a layer is referred to as being "under" another layer, it can be directly under, and one or more intervening layers may also be present. In addition, it is also to be understood that when a layer is referred to as being "between" two layers, it can be the only layer between the two layers, or one or more intervening layers may also be present. Like reference numerals refer to like elements throughout.

In addition, it is to be understood that the terms "upper side" and "lower side" are defined with reference to the accompanying drawings. The "upper side" is defined as one surface of a reference layer, and the "lower side" is defined as a surface thereof facing the one surface. Thus, it is to be understood that the term "upper side" can be used interchangeably with the term "lower side".

In accordance with one aspect, a protective sheet for liquid crystal display screens may include: a base layer, an interfacial layer, and a skin layer stacked in order, wherein the base layer may include an aromatic polycarbonate resin, the interfacial layer may include an aliphatic polycarbonate resin; and the skin layer may include a cycloolefin polymer (COP) resin.

FIG. 1 illustrates a sectional view of a protective sheet for liquid crystal display screens according to one embodiment.

Referring to FIG. 1, a protective sheet 100 for liquid crystal display screens may be a multi-layer sheet, in which a base layer 105, an interfacial layer 110, and a skin layer 115 are stacked in order. The protective sheet 100 may exhibit high impact resistance to external environment.

The base layer 105 may be stacked on an upper side of a liquid crystal display screen, and may protect the liquid crystal display screen while supporting the interfacial layer 110 and the skin layer 115.

The base layer may be a transparent layer. For example, the base layer may include at least one of aromatic polycarbonate, polyolefin, polyester, and polyacrylic resins. For example, the base layer may include an aromatic polycarbonate resin.

The aromatic polycarbonate resin may be prepared by reacting a diphenol with phosgene, a halogen acid ester, a carbonic acid ester, or a combination thereof Examples of the diphenol may include 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, and 2,2-bis-(3,5-dichloro-4-hydroxyphenyl)-propane. For example, the diphenol may be 2,2-bis-(4-hydroxyphenyl)-propane, 2,2-bis-(3,5-dichloro-4-hydroxyphenyl)-propane, or 1,1-bis-(4-hydroxyphenyl)-cyclohexane. For example, the diphenol may be 2,2-bis-(4-hydroxyphenyl)-propane (also called bisphenol-A).

In addition, compounds such as resorcinol and hydroquinone may also be used as the diphenol.

The aromatic polycarbonate resin may have a weight average molecular weight from about 5,000 g/mol to about 200,000 g/mol, or, for example, from about 15,000 g/mol to about 100,000 g/mol, or, for example, from about 20,000 g/mol to about 80,000 g/mol.

The aromatic polycarbonate resin may be a homopolymer formed using one type of dihydric phenol compound, a copolymer formed using two or more types of dihydric phenol compounds, or mixtures thereof.

The aromatic polycarbonate resin may have various forms. Examples include linear polycarbonate resins, branched polycarbonate resins, copolymers thereof, mixtures thereof, polyester carbonate copolymer resins, or the like.

The base layer may be formed as a single layer, or as multiple layers in which two or more layers are stacked. The base layer may have a thickness from about 850 μm to about 1,000 μm, or, for example, from about 900 μm to about 980 μm.

The skin layer 115 may be prepared from a cycloolefin polymer (COP) resin having low water absorption in order to secure dimensional stability of a window sheet. The cycloolefin polymer resin may exhibit high heat resistance, high transparency, high elasticity, low moisture absorption, and excellent dielectric properties.

In one implementation, the cycloolefin polymer resin may have a repeat unit of a mono-cycloolefin monomer, the mono-cycloolefin monomer being defined as having one carbon-carbon double bond in a ring. For example, the mono-cycloolefin monomer may be a cycloolefin monomer of a single ring, such as cyclobutene, cyclopentene, cyclohexene, cycloheptene, cyclooctene, or the like. These may be used alone or in combination thereof.

In another embodiment, the skin layer may include a cycloolefin addition polymer, and may include an addition polymer having a repeat unit of a cyclic conjugated diene monomer, the cyclic conjugated diene monomer being defined as having a conjugated carbon-carbon double bond in a ring. For example, the cyclic conjugated diene monomer may include 1,3-cyclopentadiene, 1,3-cyclohexadiene, 1,3-cycloheptadiene, 1,3-cyclooctadiene, or the like. These may be used alone or in combination thereof.

In a further implementation, the skin layer may include a cycloolefin addition polymer, and may include a repeat unit of a norbornene monomer, such as norbornene, tetracyclododecene, dicyclopentadiene, or the like.

The cycloolefin polymer resin may have a glass transition temperature (Tg) from about 123° C. to about 135° C. Within this range, the protective sheet may undergo less deterioration in mechanical strength and may exhibit excellent viscosity and moisture resistance.

The interfacial layer 110 may be formed between one surface of the base layer 110 and one surface of the skin layer 105 facing the base layer.

The cycloolefin polymer resin forming the skin layer may have a water absorption of about 0.03% to about 0.04%, which is much lower than 0.2% of a polymethyl methacrylate (PMMA) resin. Thus, despite extremely high dimensional stability, the cycloolefin polymer resin may exhibit poor compatibility with a polycarbonate resin used as the base layer. If the skin layer were to directly contact the base layer, there is a possibility that the skin layer could peel off of the base layer at an interface therebetween upon coextrusion for integral formation of the base and skin layers. To address this issue, an aliphatic polycarbonate resin may be introduced as the interfacial layer in order to secure compatibility between the base and skin layers. The aliphatic polycarbonate resin may be a polypropylene carbonate (PPC) resin.

The PPC resin may be a polypropylene carbonate or polypropylene carbonate copolymer having a high weight average molecular weight, for example, from about 10,000 g/mol to about 1,000,000 g/mol.

The base layer may have a thickness from about 850 μm to about 1,000 μm. The interfacial layer may have a thickness from about 30 μm to about 50 μm. The skin layer may have a thickness from about 50 μm to about 80 μm.

The protective sheet may have a thickness ratio of the base layer to the skin layer from about 92:8 to about 95:5. Within this range, warpage of the protective sheet may be reduced by controlling water absorption of the skin and base layers, and the protective sheet may sufficiently protect a liquid crystal display from external environment or impact.

The protective sheet may have a thickness from about 930 μm to about 1,130 μm. Within this range, the protective sheet may be used for protection of liquid crystal display screens in display apparatuses.

Figure 2:
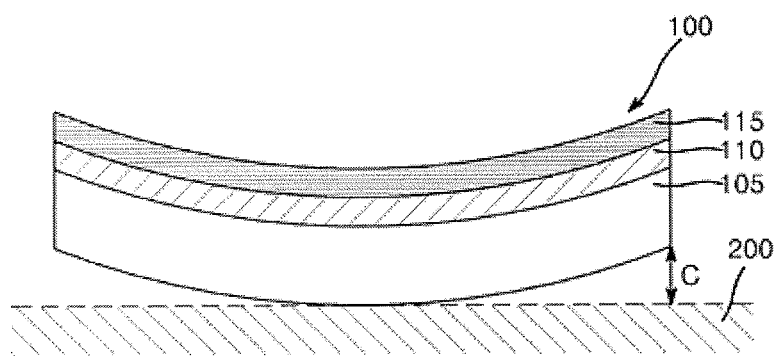
FIG. 2 illustrates a conceptual diagram for measurement of warpage of a protective sheet for liquid crystal display screens.

FIG. 2 illustrates a conceptual diagram for measurement of warpage of a protective sheet for liquid crystal display screens. Referring to FIG. 2, when the protective sheet 100 for liquid crystal display screens, in which the base layer 105, the interfacial layer 110 and the skin layer 115 are stacked in order, is warped from a floor 200 or substrate, a maximum height (C) of warpage from the floor or substrate is measured as warpage.

According to the embodiments, the protective sheet for liquid crystal display screens may have a maximum height of about 0.3 mm or less warped from the floor or substrate, as measured after the protective sheet having a width, length and thickness of about 50 mm, about 100 mm and about 1000 μm is left at about 85° C. and about 85% RH for about 120 hours. Within this range, the protective sheet exhibits high reliability and excellent dimensional stability.

In addition, the protective sheet for liquid crystal display screens according to embodiments may have a water absorption of about 0.05% or less.

The protective sheet for liquid crystal display screens may further include a functional layer on an upper side of a hard coating layer to provide an additional function.

The functional layer may include at least one of an anti-reflective layer, an anti-static layer, and an anti-fingerprint layer.

The protective sheet for liquid crystal display screens may further include an adhesive layer on a lower side of the base layer to be stacked on the liquid crystal display or on a stacked body in which the liquid crystal display is stacked.

In another embodiment, a liquid crystal display may include the protective sheet for liquid crystal display screens. The protective sheet may be provided in the liquid crystal display by a typical method.

Figure 3:
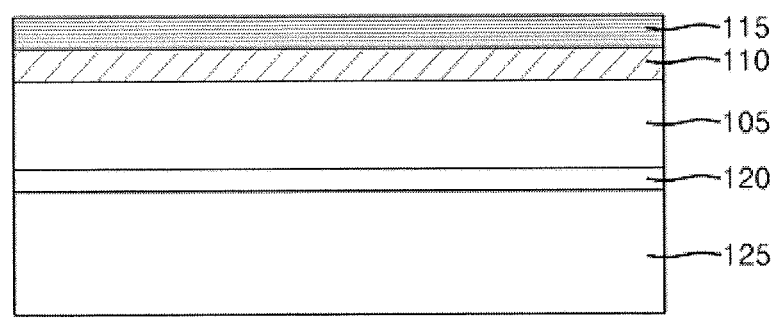
FIG. 3 illustrates a sectional view of a structure in which a protective sheet for liquid crystal display screens is stacked on a window.

The protective sheet for liquid crystal display screens may be stacked on the liquid crystal display to protect the liquid crystal display screen. FIG. 3 illustrates a sectional view of a structure in which a protective sheet for liquid crystal display screens is stacked on a window sheet. Referring to FIG. 3, a window sheet 120 may be stacked on a liquid crystal display screen 125, and a protective sheet for liquid crystal display screens, which includes a base layer 105, an interfacial layer 110, and a skin layer 115, may be stacked on the window sheet 120.

The liquid crystal display may be a display included in a mobile phone, a computer, or the like, as examples.

EXAMPLES

The following Examples and Comparative Examples are provided in order to highlight characteristics of one or more embodiments, but it is to be understood that the Examples and Comparative Examples are not to be construed as limiting the scope of the embodiments, nor are the Comparative Examples to be construed as being outside the scope of the embodiments. Further, it is to be understood that the embodiments are not limited to the particular details described in the Examples and Comparative Examples.

Example 1

Using an extruder capable of performing coextrusion (Manifold type), 100 parts by weight of an aromatic polycarbonate resin (Teijin Ltd, L1250Y) was melted in a main extruder, and 100 parts by weight of a PPC resin (weight average molecular weight: 100,000 g/mol, manufactured by Cheil Industries, Inc) and 100 parts by weight of a COP resin (JSR Corp, ARTON RX4500) were melted in a sub-extruder. The melted resins were mixed in a feed block or a die section according to the type of coextrusion, and subjected to extrusion into a triple-layer structure, thereby preparing a protective sheet including a 950 μm thick base layer, a 30 μm thick interfacial layer, and a 50 μm thick skin layer.

Comparative Example 1

A protective sheet for liquid crystal display screens was prepared in the same manner as in Example 1 except that the interfacial layer was not formed, and the base and skin layers, which have thicknesses as listed in Table 1, were formed through coextrusion. The prepared protective sheet was evaluated as to the properties described below. Results are shown in Table 1.

Comparative Example 2

A protective sheet for liquid crystal display screens was prepared in the same manner as in Comparative Example 1 except that the skin layer was formed to a thickness as listed in Table 1 using a PMMA resin. The prepared protective sheet was evaluated as to the properties described below. Results are shown in Table 1.

Evaluation of Properties (1) Warpage (mm): A protective sheet for liquid crystal display screens, which had a width and length of 50 mm×100 mm and included each of layers formed to a thickness as listed in Table 1, was prepared. For evaluation of reliability, the prepared protective sheet was left at 85° C. and 85% RH for 120 hours, followed by aging at 25° C. for 4 hours. Warpage before and after evaluation was measured according to FIG. 2.

(2) Water absorption (%): Change in water absorption was measured using weight differences between before and after measurements of a specimen at 80° C. and relative humidity of 47% for 5 minutes.

(3) Peeling: The occurrence of peeling at an interface between the base and skin layers of the prepared protective sheet for liquid crystal display screens was observed by the naked eye, and an X-cutting test was performed on the protective sheet (Peeling: O, No Peeling: X).

TABLE 1

|  |  | Example 1 | Comparative Example 1 | Comparative Example 2 |
| --- | --- | --- | --- | --- |
| Base layer | Thickness | 950 | 980 | 980 |
| Interfacial layer | (μm) | 30 | — | — |
| Skin layer |  | 50 | 50 | 50 |
| Warpage (Before high temperature and humidity) |  | 0.08 | 0.06 | 0.07 |
| Warpage (After high temperature and humidity) |  | 0.32 | 0.34 | 0.68 |
| Water absorption (%) |  | 0.037 | 0.034 | 0.178 |
| Peeling |  | X | O | X |

As shown in Table 1, it could be seen that the protective sheet of Example 1, in which a PPC resin was used as the interfacial layer and a COP resin was used as the skin layer, exhibited superior peel resistance to the protective sheet of Comparative Example 1, in which the interfacial layer was not formed. In addition, it could be seen that the protective sheet of Example 1 exhibited much lower water absorption than the protective sheet of Comparative Example 2, in which a PMMA resin was used as the skin layer, and exhibited a low change in warpage before and after high temperature and humidity treatment, thereby indicating excellent dimensional stability.

By way of summation and review, tempered glass and transparent plastic materials may be placed on a front outermost portion of mobile phones and notebooks to protect the products and screens thereof. Despite high hardness and excellent abrasion resistance, tempered glass has drawbacks, such as high manufacturing costs, heavy weight, and low impact resistance. Transparent plastic materials are easily fabricated due to light weight and low manufacturing costs thereof. However, transparent plastic materials may exhibit low dimensional stability and decolorization due to low hardness, low abrasion resistance, and vulnerability to environmental change (ultraviolet light, high temperature, and humidity). Thus, properties of resins included in the transparent plastic materials may be improved, or additives (UV stabilizers and the like) may be added thereto. In addition, a hard coating layer may be formed on the protective sheet to compensate for the properties thereof.

Generally, as a protective sheet for liquid crystal display screens of mobile phones and the like, a protective sheet of a double layer structure (PMMA/PC), which may satisfy both excellent surface properties (scratch resistance) and impact resistance, may be used. However, commercialized PC and PMMA resins have significantly different water absorption rates, and thus exhibit large difference in expansion due to environmental changes such as high temperature and humidity. As a result, the protective sheet can suffer from severe warpage and deterioration in dimensional stability.

Embodiments provide a protective sheet for liquid crystal display screens that can minimize warpage while exhibiting excellent dimensional stability and peel resistance, and a display apparatus including the same.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A protective sheet for liquid crystal display screens, the protective sheet comprising:
    a base layer;
    an interfacial layer; and
    a skin layer, stacked in order, the skin layer directly contacting the interfacial layer, and the base layer directly contacting the interfacial layer,
    wherein
    the base layer includes an aromatic polycarbonate resin, the interfacial layer is made of an aliphatic polycarbonate resin, and the skin layer includes a cycloolefin polymer resin, and
    the aliphatic polycarbonate resin is a polypropylene carbonate resin.

2. The protective sheet as claimed in claim 1, wherein the cycloolefin polymer resin includes at least one repeat unit derived from the group of monocycloolefin monomers, cyclic conjugated diene monomers, and norbornene monomers.

3. The protective sheet as claimed in claim 2, wherein the cycloolefin polymer resin includes at least one repeat unit derived from the group of cyclobutene, cyclopentene, cyclohexene, cycloheptene, cyclooctene, 1,3-cyclopentadiene, 1,3-cyclohexadiene, 1,3-cycloheptadiene, 1,3-cyclooctadiene, norbornene, tetracyclododecene, and dicyclopentadiene.

4. The protective sheet as claimed in claim 1, wherein:
    the base layer has a thickness from about 850 μm to about 1,000 μm,
    the interfacial layer has a thickness from about 30 μm to about 50 μm, and
    the skin layer has a thickness from about 50 μm to about 80 μm.

5. The protective sheet as claimed in claim 1, wherein the protective sheet has a thickness ratio of the base layer to the skin layer from about 92:8 to about 95:5.

6. The protective sheet as claimed in claim 1, wherein the protective sheet has a water absorption of about 0.05% or less.

7. The protective sheet as claimed in claim 1, wherein the protective sheet has a warpage of about 0.3 mm or less relative to a floor or substrate on which the protective sheet is placed, as measured after a sample of the protective sheet having a width, length and thickness of about 50 mm, about 100 mm and about 1,000 μm is left at about 85° C. and about 85% RH for about 120 hours.

8. The protective sheet as claimed in claim 1, further comprising at least one functional layer selected from an anti-reflective layer, an anti-static layer, and an anti-fingerprint layer, the at least one functional layer being stacked on an upper side of the skin layer.

9. A liquid crystal display comprising the protective sheet for liquid crystal display screens as claimed in claim 1.

* * * * *